United States Patent [19]

Amiard et al.

[11] 3,947,430

[45] Mar. 30, 1976

[54] COPOLYMERS OF OLEFINS OR OLEFINS AND NON-CONJUGATED DIENES WITH UNSATURATED FURAN AND/OR THIOPHENE DERIVATIVES

[75] Inventors: Yves Amiard, Pau; Jean-Paul Bellissent, Billere; Gilbert Marie, Pau, all of France

[73] Assignee: Societe Nationale des Petroles Aquitaine, Courbevoie, France

[22] Filed: Mar. 25, 1974

[21] Appl. No.: 454,225

Related U.S. Application Data

[63] Continuation of Ser. No. 142,368, May 11, 1971, abandoned.

[30] Foreign Application Priority Data

May 11, 1970 France............................ 70.17017

[52] U.S. Cl. ...... 260/79.5 P; 260/79.5 B; 260/79.7; 260/80.72; 260/80.78; 260/88.1 R
[51] Int. Cl.². C08F 15/02; C08F 27/06; C08D 1/14
[58] Field of Search ........... 260/79.7, 88.1 R, 80.72, 260/88.5, 79.5

[56] References Cited
FOREIGN PATENTS OR APPLICATIONS
487,604   6/1938   United Kingdom............ 260/88.1 R

OTHER PUBLICATIONS

Chem. Abst., 62, 9239(b).

*Primary Examiner*—Christopher A. Henderson, Jr.
*Attorney, Agent, or Firm*—Burgess, Ryan and Wayne

[57] ABSTRACT

A process for the preparation of new copolymers of olefins or olefins and non-conjugated dienes with unsaturated furan and/or thiophene derivatives, by coordination catalysis is disclosed.

The copolymers of present invention are characterized by the fact that the monomers derived from furan or thiophene have the formula

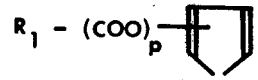

where X represents oxygen or sulphur, $p$ equals 0 or 1, and $R_1$ represents, when $p$ equals 0, a vinyl radical or

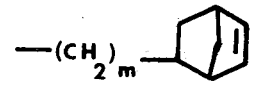

$m$ being an integer from 0 to 12, and, when $p$ equals 1, an alkenyl radical of from 2 to 20 carbon atoms.

These copolymers can replace polyolefins or copolymers of olefins or olefins and dienes, in cases where resistance to ultra-violet radiation is needed.

16 Claims, No Drawings

COPOLYMERS OF OLEFINS OR OLEFINS AND NON-CONJUGATED DIENES WITH UNSATURATED FURAN AND/OR THIOPHENE DERIVATIVES

This is a continuation of application Ser. No. 142,368, filed May 11, 1971, now abandoned.

The present invention concerns new olefin copolymers, in particular copolymers of alpha-olefins, or of olefins and non-conjugated dienes, with unsaturated furan or thiophene derivatives.

It also concerns a process to prepare these copolymers, and where they are elastomeric in character, it also concerns their vulcanization, and the vulcanized elastomers obtained.

It is known that olefins, and particulary alpha-olefins, can be polymerized and copolymerized at low pressures, using co-ordination catalytic systems formed by the association of compounds of elements in the subgroups IV to VIII of the Periodic Table with organometallic compounds of the elements in groups I to III of this Table.

These catalytic systems are also known to promote the copolymerization of alpha-olefins with certain ethers or thioethers possessing an alkenyl substitution preferably unsaturated in the ω position.

The applicants have discovered that useful copolymers could be obtained by copolymerizing, by means of these catalytic systems, olefins, particularly alpha-olefins, or olefins and non-conjugated dienes with certain unsaturated derivatives of furan and/or thiophene.

Copolymers according to the invention are prepared by placing in contact one or more olefins and optionally one or more non-conjugated dienes with one or more unsaturated furan or thiophene compounds of the general formula

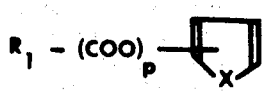

where X represents oxygen or sulfur, $p$ equals 0 or 1, and $R_1$ represents, when $p$ equals 0 a vinyl radical or

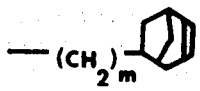

$m$ being an integer from 0 to 12, and, when $p$ equals 1, an alkenyl radical with from 2 to 20 carbon atoms, in the presence of a co-ordination catalysis system containing an organo-metallic compound (A) of one or more metals in groups I, II or III of the Periodic Table, and a compound (B) of a transition metal belonging to one of groups IV to VIII in this Table.

The olefins that can be copolymerized by the process according to the present invention may contain between 2 and 18 carbon atoms. These are, in particular, alpha-olefins with the general formula $R — CH = CH_2$, where R represents hydrogen or an cycloalkyl, cycloalkyl or cycloalkyl radical, and in particular, linear alpha-olefins such as ethylene, propene, 1-butene, 1-hexene, or 1-octene, the commonest being ethylene, propene and 1-butene.

The non-conjugated dienes that can be copolymerized by the process according to the invention are linear or cyclic. They include in particular 1,4-hexadiene, dicyclopentadiene, tricypopentadiene, 1,5-cyclooctadiene, 5-methylene 2-norbonene, 5-ethylidene 2-norbonene, etc.

Compounds derived from furan or thiophene that can be copolymerized with olefins or olefins and non-conjugated dienes include vinylfuran, the adduct of vinylfuran with cyclopentadiene, vinylthiophene and its adduct with cyclopentadiene, furfuryl undecylenate, furfuryl dodecenoate, furfuryl octadecenoate, etc. In addition to the unsaturated radical, the heterocycle may contain one or more substituents e.g. cycloalky, cycloalkyl, alkoxy, aryloxy or dialkylamino radicals having 1 to 16 carbon atoms in the alkyl chain, or halogen.

The copolymers obtained by the process according to the present invention have a high enough molecular weight to remain solid at ordinary temperatures. They are substantially linear, and may be heat-plastic or elastomeric, depending on the type and proportions of the monomers used in preparing them. These polymers are extremely resistant to deterioration under the effect of ultra-violet light and to thermo-oxidizing deterioration.

Heat-plastic copolymers are suitable for use in shaping operations in the heat-plastic state, to provide films, sheets, sections, etc. Ethylene-based copolymers, for instance, can be used in electric wiring, to provide insulating sheaths.

Elastomer copolymers can be vulcanized with free-radical generators such as peroxides or with sulphur, when they contain diene-derived groups. The vulcanized copolymers obtained have excellent mechanical properties, combined with high resistance to deterioration under the effect of ultra-violet radiation and thermo-oxidizing deterioration, and can be used, for instance, to make sealing joints for the building industry, conveyor belts, etc.

Copolymers according to the invention contain from 99.9 to 75 %, and preferably 99.5 to 85 % by weight of olefinic and optionally dienic non-polar groups, and from 0.1 to 25 % and preferably 0.5 to 15 % by weight of polar groups derived from furan and/or thiophene derivatives.

When the invention is applied to the preparation of elastomers containing ethylene, the lower limit of the ethylene content is not a determining factor, but the upper limit should preferably be 75 % by weight of the copolymer, to avoid polyethylene-type crystalline structure. The proportion of the second olefin, particularly an alpha-olefin such as propene or 1-butene, or of the second olefin and non-conjugated diene, can range from 5 to 75 % by weight of the copolymer; the non-conjugated diene content can range from 0 to 20 % by weight, and the polar monomer content from 0.1 to 25 %, and preferably 0.5 to 15 % by weight.

Catalytic systems that are particularly suitable for the preparation of copolymers, in accordance with the invention, are formed from the association or organic aluminium compounds with titanium, vanadium, tungsten, zirconium, etc. derivatives, for instance halogenides, oxy-halogenides, compounds in which at least one valency of the transition metal is saturated by a heteroatom, inparticular, oxygen or nitrogen, linked with an organic grouping, such as acetylacetonates, benzylacetonates, alcoholates, and the like. In certain cases, it may be an advantage to use a complex of the transition metal derivative with a ligand selected from aliphatic ethers such as diethylic and dipropyl ethers or diethoxyethane, cyclic ethers such as tetrahydrofuran or dioxane, thioethers, phosphines, arsines, tertiary amines such as trimethylamine, or methyldiethylamine, heterocyclic nitrogen bases such as pyridine or quinoline, or other suitable substances such as $\beta$-diketones, cetoesters, hydroxyaldehydes, aminoaldehydes, aminoalcohols, etc.

Excellent results are obtained whenever the catalytic system contains an organo-aluminic of the formula $AlCl_{(3-n)}Yn$, where $n$ is a number that can equal 1, 1.5, 2 or 3, and Y is a lower alkyl radical such as ethyl, propyl or isobutyl, associated with a titanium halogenide such as titanium trichloride or tetrachloride, or a vanadium halogenide or oxyhalogenide such an vanadium trichloride, tetrachloride or oxytrichloride, these titanium or vanadium halogenides possibly being made complex by tetrahydrofuran, an aliphatic ether, tertiary amine, pyridine or quinoline.

The catalyst may suitably be deposited on a carrier or can be linked to this carrier chemically. The carrier may be either an organic or inorganic material.

The catalytic system may also include a certain percentage of an activator, and in particular an alkoxyalkyl halogensulphate or halogensulphite, as ethoxyethyl chlorosulphate or chlorosulphite, a halogensulphinyl or halogenosulphonylthiophene such as di-2,4-(chlorosulphonyl)-thiophene, or a dichloroarylphosphine such as dichlorophenylphosphine.

In preparing the catalytic system, the compounds (A) and (B) may or may not be mixed before being put into the reactor. For instance, the catalyst may be preformed and possibly "aged", and then fed into the mixture for continuously or intermittently.

The activator, if present, may be mixed with the catalyst before being added to the reaction mixture, or it may be added directly to the mixture during polymerization, continuously or in fractions; another method is to mix it first with the transition metal or metals compound or compounds.

The catalytic system contains quantities of compounds A and B such that the ratio between the number of metal atoms of compound A and the number of transition metal atoms of compound B is between 1 and 50, and suitably between 3 and 30.

The quantity of activator, if any, can vary widely: from 0.5 to 25 moles of activator per atom of transition metal may be used, but the reaction mixture must contain more of compound A, expressed in metal atoms, than activator.

Copolymerization is effected in a suitable solvent, suitably consisting of an aliphatic, aromatic or cycloalkane hydrocarbon; as heptane, cyclohexane, benzene or mixtures of such solvents. Halogenated hydrocarbons that are inert in relation to the catalyst may also be used, as chloroform, chlorobenzene, tetrachlorethylene, etc. The olefins themselves can act as a solvent, and copolymerization can be performed, for instance, in the olefin or olefins to be copolymerized, taken in the liquid state.

Copolymerization may be performed at temperatures ranging from $-80°$ to $+110°C$, and suitably at between $-30°$ and $+60°C$.

The pressures normally applied during polymerization range from 1 to 10 atmospheres, but it is possible to operate at higher pressures.

The proportion of polar monomer placed in contact with the olefins is chosen so that the final copolymer will contain from 0.1 to 25 % by weight of groups derived from it.

The whole of the polar monomer is usually put into the reactor before the catalytic system is added. However, all or part of the monomer may be added continuously or intermittently, during polymerization.

In certain cases, it may be an advantage for the polar monomer to be present in the polymerization mixture in the form of a complex with a Lewis acid, for example a trialkyl aluminium, alkylaluminium dihalogenide, aluminium halogenide, zinc dichloride or tin tetrachloride. This complex may be prepared in situ in the reaction mixture, or preformed before being placed in the polymerization zone.

Copolymerization may be performed on a continuous basis, in which case the solvent, monomers and catalytic system are fed continuously into the polymerization zone at rates that will ensure that they remain long enough in the zone to obtain the required concentration of copolymer in the reaction mixture.

During copolymerization, the reactive mixture is deprived of free oxygen by the passage of an inert gas such as nitrogen or argon, before polymerization takes place.

The duration of copolymerization usually varies depending on operating conditions. It generally lasts between 30 minutes and 3 hours.

At the end of the operation, the catalyst is destroyed by some method known in the prior art. The copolymer is then separated from the solvent by coagulation using an alcohol, by drawing off with the solvent vapour, or by any other method allowing the polymer to be isolated from solutions containing it.

The examples below will illustrate the invention, but, these Examples are not to be considered as limitive.

EXAMPLE 1

Copolymerization is effected in a cylindrical glass reactor with an inside diameter of 10 cm and a capacity of 1000 millilitres, equipped with a stirrer, a funnel through which the heterocyclic monomer is fed in, two funnels through which the catalyst components are fed in, and a gas-inlet and a gas-outlet tubes. The temperature of the reactor is kept at $+10°C$ by means of a thermostatically controlled bath in which the reactor is submerged.

The funnels on top of the reactor are drained and a nitrogen atmosphere maintained inside them. 60 millimoles of vinylfuran are placed in the heterocyclic monomer funnel. 1 millimole of vanadyl trichloride $VOCl_3$ in 50 ml of anhydrous n-heptane is placed in one of the funnels for the catalytic system, and 30 millimoles of diethylaluminium monochloride $Al(C_2H_5)_2Cl$ in the same quantity of n-heptane in the other.

750 ml of n-heptane, from which humidity and gas have previously been extracted, are fed into the reactor, which has a nitrogen atmosphere maintained inside it. The supply of nitrogen is stopped, and a mixture of ethylene and hydrogen injected by the gas-inlet tube, in a molar ratio of ethylene to hydrogen of 3; this mixture circulates at a rate of 100 normal liters an hour throughout the duration of copolymerization. Twenty minutes after the start of injection of the gaseous mixture, the vinylfuran and catalytic system components are added drop by drop, the operation being completed in 60 minutes.

After injection of the catalysts, polymerization is halted by adding 20 ml of ethanol. The copolymer solution is poured into ethanol to precipitate the copolymer, which is washed with ethanol, then dried in a drier in a vacuum, at a temperature of 50° to 60°C approximately.

23 grams of a crystalline substance are obtained, with a viscometric molecular mass of approximately 51000, a melting point of 133°C, and melt index of 0.1.

This ethylene and vinylfuran copolymer contains 97.8 % weight of ethylene and 2.2 % weight of vinylfuran.

EXAMPLE 2

The process of Example 1 is repeated, except that the heptane is replaced by benzene, the vanadyl trichloride by 1.5 millimoles of vanadium trichloride forming a complex with tetrahydrofuran $VOCl_3 \cdot 3(\text{tetrahydrofuran})$, and 45 millimoles of diethylaluminium monochloride are used.

33 grams of a crystalline ethylene and vinylfuran copolymer are obtained; this substance has a molecular mass of 49000, a melt index of 0.2 and a melting point of 134°C. It contains 2.4 % weight of vinylfuran.

EXAMPLE 3

Operating in the same way as in Example 2, the vinylfuran is replaced by 25 millimoles of the cyclopentadiene-vinylfuran adduct

which is all injected together; the molar ratio of ethylene to hydrogen is altered to 1.5, and 1 millimole of the complex $V Cl_3 \cdot 3(\text{tetrahydrofuran})$ and 30 millimoles of diethylaluminium monochloride are used as catalysts, being injected over a 40-minute period.

25 grams of a crystalline copolymer are obtained, containing 97.5 % by weight of ethylene and 2.5 % cyclopentadiene-vinylfuran adduct.

EXAMPLE 4

The operation is repeated in the same way as in Example 3, by replacement of the ethylene and hydrogen mixture by a mixture of propene and ethylene in a molar ratio of propene to ethylene of 1.2, and 2 millimoles of vanadyl trichloride $VO Cl_3$ and 10 millimoles of diethylaluminium monochloride are used as catalysts.

After drying, 13 grams of a solid substance with the appearance of a non-vulcanized elastomer are obtained. This copolymer contains 41 % by weight of ethylene, 56.1 % propene and 2.9 % cyclopentadiene-vinylfuran adduct.

Vulcanization 100 parts weight of copolymer are mixed in a roller mixer with 60 parts HAF carbon black, 5 parts zinc oxide, 0.32 parts sulphur, and 6.75 parts 40 % dicumyl peroxide.

The mixture is heated to 160°C for 1 hour in a press.

Mechanical properties of the vulcanized substance

| | |
|---|---|
| Tensile strength | 210 kg/sq.cm |
| Breaking elongation | 320 % |
| Modulus of elasticity at 300 % elongation | 190 kg/sq.cm |
| Shore A hardness | 74 |
| Rebound | 62 % |

EXAMPLE 5

The operation is repeated in the same way as in Example 1, replacing the vinylfuran by 25 millimoles of furfuryl octadecenoate

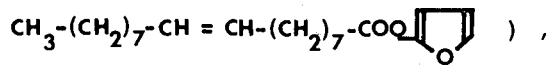

altering the molar ratio of ethylene to hydrogen in the gaseous mixture to 5.25, and using 2 millimoles of the complex $V Cl_3 \cdot 3(\text{tetrahydrofuran})$ and 60 millimoles of diethylaluminium monochloride as catalysts.

54.7 grams of a copolymer crystalline in X-rays are obtained, with a viscosimetric moleculr mass of 82000, a melt index of 0.66 and a melting point of 132°C. This copolymer contains 96.8 % by weight of ethylene and 3.2 % by weight of furfuryl octadecenoate.

EXAMPLE 6

750 ml of a mixture of benzene and n-heptane, containing 50 % volume of benzene, are fed into a reactor similar to the one used in Example 1, kept at a temperature of 20°C and with a nitrogen atmosphere maintained inside it.

50 millimoles of vinylthiophene

are placed in the polar monomer funnel, 3 millimoles of vanadyl trichloride $VO Cl_3$ in 50 ml of a benzene/heptane mixture in one of the catalyst-injection funnels, and 15 millimoles of diethylaluminium monochloride in the same quantity of the same mixture in the other funnel.

The supply of nitrogen is then stopped, and a mixture of ethylene and hydrogen is injected by the gas-inlet tube, with a molar ratio of ethylene to hydrogen of 3; this mixture circulates at an hourly rate of 140 normal liters.

Ten minutes after the start of injection of the gaseous mixture, the vinylfuran and catalysts are injected in a single operation.

Polymerization is halted 60 minutes after the start of injection of the catalysts, by the addition of 20 ml of ethanol to the reaction mixture; the copolymer is then separated from the mixture, and dried as described in Example 1.

31.8 grams of a crystalline copolymer of ethylene and vinylthiophene are obtained, with a viscosimetric molecular mass of 109000 containing 1.6 % by weight of sulphur.

EXAMPLE 7

750 ml of benzene and 25 millimoles of vinylthiophene are fed into a reactor similar to the one described in Example 1, with a nitrogen atmosphere maintained inside it and held at a temperature of 20°C.

The supply of nitrogen is stopped, and a mixture of propene and ethylene injected by the gas-inlet tube, with a molar ratio of propene to ethylene of 2; this mixture circulates at a rate of 99 normal liters an hour. Twenty minutes after the start of injection of this gas mixture, the molar ratio of propene to etylene is changed to 1, and 2 millimoles of vanadium tetrachloride V Cl$_4$ in 60 ml of benzene and 16 millimoles of etylaluminium sesquichloride ½ [Cl$_3$ Al$_2$ (C$_2$H$_5$)$_3$] in the same quantity of benzene are added by the catalyst-injection funnels.

The catalysts are injcted over a 30-minute period, and polymerization is halted 40 minutes after the start of injection of these catalysts by the addition of 30 ml of ethanol. Separation and drying of the copolymer are carried out as described in example 1.

29.5 grams of a substance with the appearance of a non-vulcanized elastomer is obtained. This ethylene/-propene/vinylthiophene copolymer is amorphous in X-rays, and possesses a viscosimetric molecular mass of 68000. It contains 48 % by weight of ethylene and 0.7 % by weight of sulphur, namely 2.4 % weight of vinylthiophene.

After vulcanization, as described in Example 4, the vulcanized copolymer has the following mechanical properties:

| | |
|---|---|
| tensile strength | 195 kg/sq.cm |
| breaking elongation | 440 % |
| modulus of elasticity at 300 % elongation | 120 kg/sq.cm |
| Shore A hardness | 67 |
| rebound | 65 % |

EXAMPLE 8

The same operation is carried out as in Example 7, but replacing the vinylthiophene with the adduct of vinylthiophene and cyclopentadiene

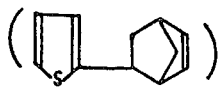

and the benzene with a mixture of benzene and n-heptane containing 50 % by volume of benzene, carrying out the polymerization at 0°C, and using 2 millimoles of vanadyl trichloride and 10 millimoles of diethylaluminium chloride Al Cl (C$_2$H$_5$)$_2$ as catalysts, each catalytic component being diluted in 60 ml of benzene.

56 grams of an ethylene/propene/adduct copolymer is obtained, with the appearance of a non-vulcanized elastomer. This copolymer is amorphous in X-rays, and contains 0.7 % by weight of sulphur.

After vulcanization, using the method described in Example 4, the vulcanized copolymer possesses the following mechanical properties:

| | |
|---|---|
| tensile strength | 200 kg/sq.cm |
| breaking elongation | 390 % |
| modulus of elasticity at 300 % elongation | 130 kg/sq.cm |
| Shore A hardness | 68 |
| rebound | 65 % |

EXAMPLE 9

The operation is carried out in the same way as in Example 7, replacing the propene by 1-butene and the vinylthiophene by 50 millimoles of vinylfuran.

During the saturation phase, the molar ratio of butene to ethylene is 3, and it is then changed to 2, at which level it is held during the reaction phase. The other operating conditions are the same as in Example 7.

18 grams of a solid substance with the appearance of a non-vulcanized elastomer is obtained. This ethylene/1-butene/vinylfuran copolymer is amorphous in X-rays. It has a viscosimetric molecular mass of 130000 and contains 37 % by weight of ethylene and 2.3 % of vinylfuran.

EXAMPLE 10

A reactor similar to the one in Example 1 is used, but with an extra funnel for a diene monomer. The reactor is submerged in a thermostatic bath, keeping it at a temperature of 20°C.

The funnels on top of the reactor are drained and a nitrogen atmosphere maintained inside them. 25 millimoles of dicyclopentadiene in 60 ml of benzene are placed in the funnel for the diene monomer, 25 millimoles of vinylthiophene in 60 ml of benzene in the funnel for the polar monomer, 2 millimoles of V Cl$_4$ in 60 ml of benzene in one of the funnels for the catalytic system components, and 16 millimoles of etylaluminium sesquichloride, in the same volume of benzene, in the other.

750 ml of benzene are placed in the reactor, inside which a nitrogen atmosphere is maintained. The supply of nitrogen is then stopped, and a mixture of propene and ethylene injected by the gas-inlet tube, with a molar ratio of propene to ethylene of 2; this mixture circulates at a rate of 100 normal liters an hour. When it has been circulating for 20 minutes, the molar ratio of propene to ethylene is changed to 1, and the diene, polar monomer and two catalyst components are added drop by drop, each over a 30-minute period.

Polymerization is halted 40 minutes after the start of injection of the catalysts, by adding 30 ml of ethanol. The copolymer is separated and dried as described in example 1.

26 grams of a substance with the appearance of a non-vulcanized elastomer is obtained. This ethylene/-propene/dicyclopentadiene/vinylthiophene copolymer contains 50 % by weight of ethylene and 2.4 % vinylthiophene, and 5.2 non-aromatic double bonds, determined by the iodine index method, per 1000 carbon atoms.

Vulcanization 100 parts weight of copolymer are mixed in a roller mixer with 50 part HAF carbon black, 5 parts zinc oxide, 2 parts sulphur, 1 part mercaptobenzothiazole and 2 parts tetramethylthiurame disulphide.

The mixture is heated to 160°C for 1 hour in a press.
Properties of the vulcanized substance

| | |
|---|---|
| Tensile strength | 150 kg/sq.cm |
| Breaking elongation | 320 % |
| Modulus of elasticity at 300 % elongation | 130 kg/sq.cm |

What is claimed is:

1. A substantially linear high-molecular weight copolymer consisting of non-polar groups derived from at least one alpha-olefin selected from the group consisting of ethylene, propene and 1-butene, and mixtures of ethylene and propene and polar groups derived from at least one member selected from the group consisting of vinyl furan, vinyl thiophene and a compound of the formula

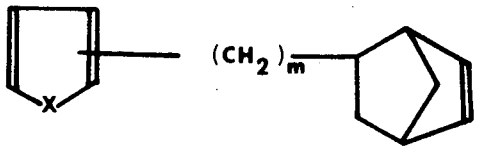

wherein X is selected from the group consisting of oxygen and sulphur and m is a integer from 0 to 12, or a halogenated or alkylated derivative of said member, said copolymer containing from 99.9 to 75% by weight of said non-polar groups and from 0.1 to 25% by weight of said polar group.

2. A copolymer according to claim 1, wherein said non-polar groups are derived from ethylene and propene or ethylene and butene, the percentage of propene-or butene-derived groups ranging from 5 to 75% of the weight of the copolymer, the ethylene content being not more than 75% of the weight of said copolymer.

3. A copolymer according to claim 1, wherein said polar groups are derived from a compound of the formula

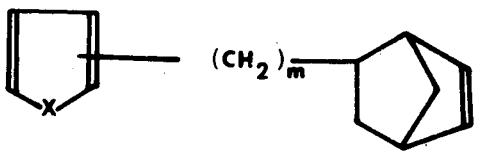

wherein X is selected from the group consisting of oxygen and sulphur and m is an integer from 0 to 12.

4. A copolymer according to claim 3, wherein said polar groups are derived from a compound of the formula

wherein X is selected from the group consisting of oxygen and sulphur.

5. A copolymer according to claim 1, wherein said polar group is a member selected from a group consisting of vinyl furan, the adduct of vinyl furan with cyclopentadiene, vinylthiophene and its adduct with cyclopentadiene, furfurylundcylenate, furfuryldodecenoate, furfuryloctadecenoate, dicylopentadiene, 1,4-hexadiene and 1,5-cyclooctadiene.

6. A copolymer according to claim 1, wherein said polar groups are derived from a member selected from a group consisting of adducts of vinyl furan with cyclopentadiene and adducts of vinylthiophene with cyclopentadiene.

7. A vulcanized composition containing a substantially linear high-molecular weight copolymer consisting of non-polar groups derived from at least one alpha-olefin selected from the group consisting of ethylene, propene and 1-butene, and mixtures of ethylene and propene and polar groups derived from at least one member selected from the group consisting of vinyl furan, vinyl thiophene and and a compound of the formula

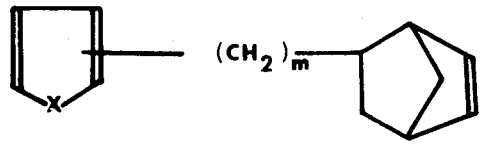

wherein X is selected from the group consisting of oxygen and sulphur and m is an integer from 0 to 12, or a halogenated or alkylated derivative of said member, said copolymer containing from 99.9 to 75 % by weight of said non-polar groups and from 0.1 to 25% by weight of said polar group, sulphur and at least one peroxide compound.

8. A copolymer according to claim 1, which is a copolymer of ethylene/propene and the adduct of dicyclopentadiene/vinylthiophene or vinyl furan.

9. A copolymer according to claim 1 which is a copolymer of ethylene/propene and the adduct of 1,4-hexadiene/vinylthiophene.

10. A copolymer according to claim 1, which is a copolymer of ethylene/1butene and the adduct of 1,4-hexadiene/vinylthiophene.

11. A copolymer according to claim 1, which is a copolymer of ethylene/1-butene and the adduct of dicyclopentadiene/vinylthiophene.

12. A copolymer according to claim 1, which is a copolymer of 97.8% by weight of ethylene and 2.2% by weight of vinylfuran.

13. A copolymer according to claim 1, which is a copolymer of ethylene/propene/vinylthiophene.

14. A copolymer according to claim 1, which is a copolymer of ethylene/1-butene/vinylfuran.

15. A copolymer according to claim 1 which is a copolymer of ethylene and vinyl furan.

16. A copolymer according to claim 1 which is a copolymer of ethylene and the adductive cyclopentadiene - vinyl furan.

* * * * *

UNITED STATES PATENT OFFICE
CERTIFICATE OF CORRECTION

Patent No. 3,947,430   Dated March 30, 1976

Inventor(s) Yves Amiard, et al

It is certified that error appears in the above-identified patent and that said Letters Patent are hereby corrected as shown below:

Column 10, line 2 : Change "furfurylundcylenate" to

--furfurylundecylenate--.

line 3: Delete "dicylopentadiene, 1,4-hexadi-"

line 4: Delete entire line.

Signed and Sealed this

Seventh Day of September 1976

[SEAL]

Attest:

RUTH C. MASON
Attesting Officer

C. MARSHALL DANN
Commissioner of Patents and Trademarks